United States Patent
Petersen et al.

(10) Patent No.: US 7,304,415 B2
(45) Date of Patent: Dec. 4, 2007

(54) INTERCONNECTION FROM MULTIDIMENSIONAL TRANSDUCER ARRAYS TO ELECTRONICS

(75) Inventors: David A. Petersen, Fall City, WA (US); John C. Lazenby, Fall City, WA (US)

(73) Assignee: Siemens Medical Solutions USA. Inc., Malvern, PA (US)

( * ) Notice: Subject to any disclaimer, the term of this patent is extended or adjusted under 35 U.S.C. 154(b) by 218 days.

(21) Appl. No.: 10/917,579

(22) Filed: Aug. 13, 2004

(65) Prior Publication Data

US 2006/0035481 A1   Feb. 16, 2006

(51) Int. Cl.
*H01L 41/00* (2006.01)

(52) U.S. Cl. .................. 310/334; 310/316.01; 310/317; 310/319

(58) Field of Classification Search ........... 310/316.01, 310/317, 319
See application file for complete search history.

(56) References Cited

U.S. PATENT DOCUMENTS

| | | | |
|---|---|---|---|
| 5,267,221 A | 11/1993 | Miller et al. | |
| 5,329,498 A * | 7/1994 | Greenstein | 367/155 |
| 5,559,388 A * | 9/1996 | Lorraine et al. | 310/334 |
| 5,592,730 A | 1/1997 | Greenstein et al. | |
| 5,997,479 A | 12/1999 | Savord et al. | |
| 6,013,032 A | 1/2000 | Savord et al. | |
| 6,087,762 A * | 7/2000 | Corbett et al. | 310/334 |
| 6,102,860 A | 8/2000 | Mooney et al. | |
| 6,126,602 A | 10/2000 | Savord et al. | |
| 6,324,907 B1 * | 12/2001 | Halteren et al. | 73/431 |
| 6,380,766 B2 | 4/2002 | Savord et al. | |
| 6,541,896 B1 * | 4/2003 | Piel et al. | 310/334 |

\* cited by examiner

*Primary Examiner*—Mark Budd (57) ABSTRACT

Interconnection from a multidimensional transducer array to electronics is provided. Circuit board modules are used in combination with z-axis interconnections of a transducer array to provide active electronics within a volume adjacent to the multidimensional transducer array. By using multiple modules to connect to different regions of z-axis interconnects, conductor paths from the transducer to the electronics are more likely of similar lengths. By including a thin or thinner region on each of the modules for active electronics, a greater volume of the space adjacent to the transducer array may include active electronics. Thicker regions route conductors from the 2D array regions, and thinner regions provide space for active electronics. Using multiple modules with z-axis interconnects may reduce cross-talk and space requirements for implementing some or all of the transmit and/or receive beamformation adjacent to the multidimensional transducer array. Additionally or alternatively, other electronics than beamformation components are provided on the modules.

31 Claims, 3 Drawing Sheets

INTERCONNECTION FROM MULTIDIMENSIONAL TRANSDUCER ARRAYS TO ELECTRONICS

BACKGROUND

The present invention relates to interconnection between a multidimensional transducer array and electronics used for imaging.

Ultrasonic transducer arrays include a plurality of elements with opposing electrodes. One electrode is connected to ground. The other electrodes are connected to beamformer or system channels for generating transmit waveforms and receiving signals responsive to echoes. The transducer arrays are typically connected to the electronics of the beamformers with flexible circuits. Flexible circuits are single or double sided sheets of electrically insulating material, such as Mylar, with deposited electrical traces. Flexible circuits require space on both ends for termination, such as termination at the transducer array on one end and termination at the beamformer electronics or coaxial cables on another end. Due to the proximate location of the electrical traces and limited insulation, cross-talk may be introduced by dense flexible circuits. For multidimensional transducers, such as two dimensional arrays, the density of electrical traces on the flexible circuit may increase. Traces for the separate electrodes of the two dimensional array are forced to fit on one or two surfaces. The resulting increase and the pitch of the traces is finer than the pitch of the array elements being interconnected, increasing the risk of cross-talk. The elements of the two dimensional array may be small, resulting in a higher impedance. The effects of cross-talk may increase as a result.

One interconnection technique for multidimensional transducer arrays is a z-axis interconnect. A plurality of electrical conductors is routed through backing block material along the z or range axis of the transducer. Other conductors then connect with the z-axis interconnects for electrical communication with the beamformer electronics. In one multidimensional transducer, a multiple layer printed circuit board, such as 48 layers of printed circuit board material, is formed and positioned adjacent to the z-axis interconnects of the multidimensional transducer array. Active electronics devices, such as beamformer circuitry, are provided on only two surfaces of the multiple layered printed circuit board. To provide more space for active electronics, the printed circuit board is lengthened or widened. The length of the conductive path from any two elements of the multidimensional transducer array to the active electronics may be different, causing a channel length mismatch and associated artifacts. The greater the difference in the lengths, the greater the artifacts that may be caused.

BRIEF SUMMARY

By way of introduction, the preferred embodiments described below include methods, systems and components for interconnection from a multidimensional transducer array to electronics. Circuit board modules are used in combination with z-axis interconnections of a transducer array to provide active electronics within a volume adjacent to the multidimensional transducer array. By using multiple modules to connect to different regions of z-axis interconnects, conductor paths from the transducer to the electronics are more likely of similar lengths. By including a thin or thinner region on each of the modules for active electronics, a greater volume of the space adjacent to the transducer array may include active electronics. Thicker regions route conductors from the 2D array regions, and thinner regions provide space for active electronics. Using multiple modules with z-axis interconnects may reduce cross-talk and space requirements for implementing some or all of the transmit and/or receive beamformation adjacent to the multidimensional transducer array. Additionally or alternatively, other electronics than beamformation components are provided on the modulars on modules.

In a first aspect, a system for interconnection with a multidimensional transducer array is provided. An array of z-axis electrical connections with the multidimensional transducer array is included with at least two modular assemblies. The z-axis is more orthogonal than parallel with a surface of the distribution of elements of the multidimensional transducer array. Each of the modular assemblies includes assembly electrical conductors, at least one active electrical component connected with at least one of the assembly electrical conductors, and a support structure common to the assembly electrical conductors and the active electrical component. The assembly electrical conductors of the first and second modular assemblies contact different ones of the z-axis electrical connections.

In a second aspect, a method is provided for interconnection with a multidimensional transducer array. At least two modules are positioned adjacent to z-axis conductors of the multidimensional transducer array. Each of the modules is adjacent to different regions of a surface of the multidimensional transducer array. The multidimensional transducer array is electrically connected with an active component of each of the at least two modules.

In a third aspect, a component is provided for interconnection with a multidimensional transducer array. The component includes at least one singular support structure. The singular support structure has two different regions, one region being thicker along at least one dimension than the other region. The thicker region has electrical conductors and the thinner region has electrical conductors and an interconnection with an active electrical device. The singular support structure also includes a surface on the thicker region. The electrical conductors are exposed in a multidimensional distribution on the surface.

In a fourth aspect, a method is provided for interconnecting active electronics with a multidimensional transducer array. A multidimensional array of conductors is connected with a subregion of the multidimensional transducer array. The conductors are routed within a substrate from being widely distributed in the multidimensional array to a thinner distribution within the substrate. The conductors from the thinner distribution are connected to at least one active electronic device.

The present invention is defined by the following claims, and nothing in this section should be taken as a limitation on these claims. Further aspects and advantages of the invention are discussed below in conjunction with the preferred embodiments and may be later claimed independently or in combination. Different embodiments may achieve or fail to achieve different objects or advantages.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Low volume, low cross-talk and high electronic density are provided with modular electronics positioned adjacent to a multidimensional transducer array. Z-axis interconnections are formed in a multidimensional transducer array. A plurality of modular electronics with exposed conductors having a same pitch as the z-axis connections or the elements of the transducer array are positioned against the multidimensional transducer array. Each of the modules has a thick section for distributing the conductors in the desired pitch. The conductors within the modular are routed to a thinner section. Active electronics are provided on the thinner section, allowing each module to have active electronics without the module exceeding the thickness of the contact subregion with the transducer array or the thick section.

Figures 1, 2:
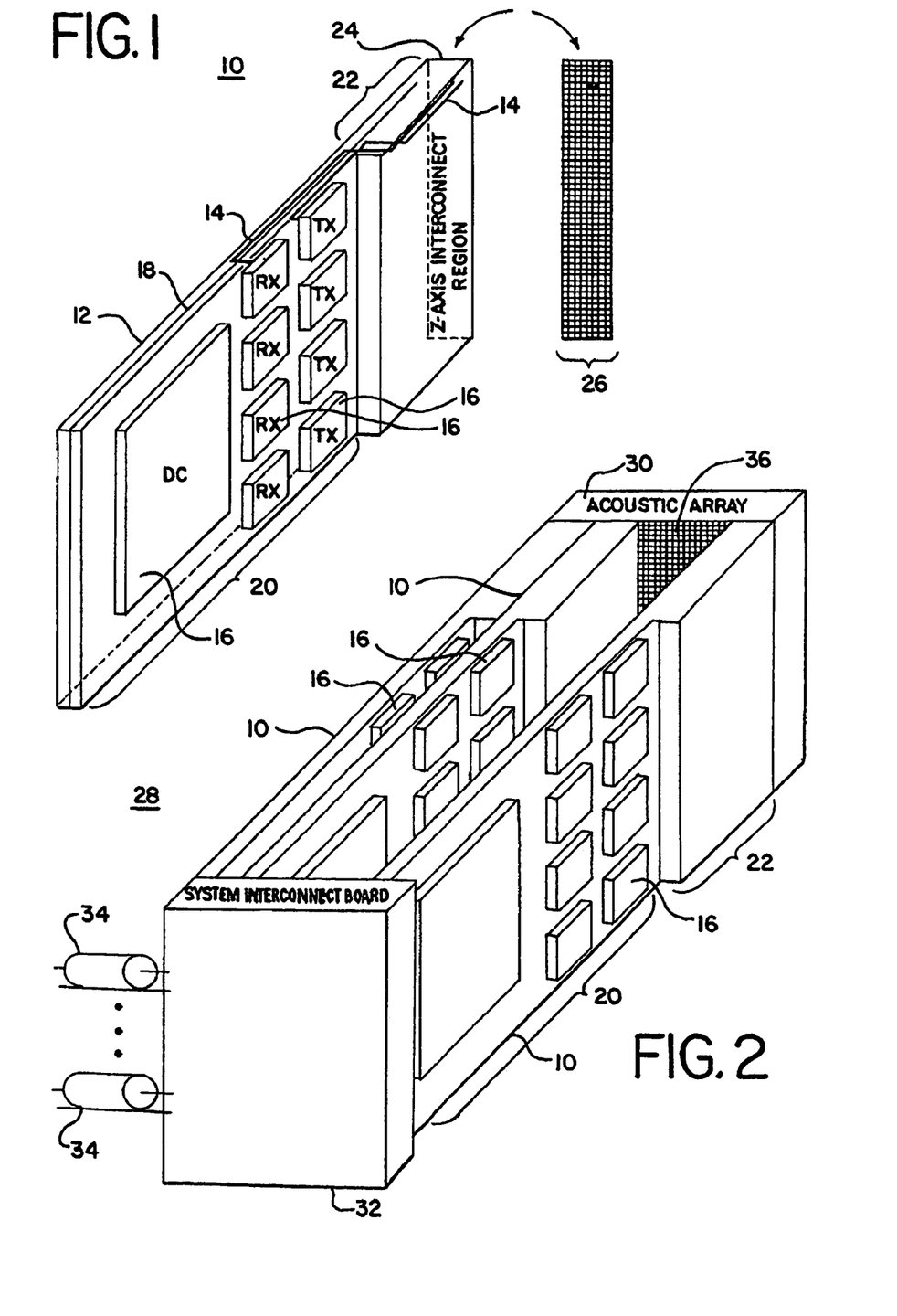
FIG. 1 is a perspective diagram of one embodiment of a modular component for connection with a multidimensional transducer array.
FIG. 2 is a perspective diagram of a plurality of modules of FIG. 1 connected with a multidimensional transducer array.

FIG. 1 shows a perspective view of a component 10 for interconnection with a multidimensional transducer array. The component 10 is a modular assembly provided on a common or singular support structure 12. The singular support structure 12 of the modular assembly 10 includes electrical conductors 14 and one or more grounding planes 18. One or more active electronics 16 connect with or are part of the singular support structure 12. Additional, different or fewer devices or structures may be included.

The singular support structure 12 is a circuit board, such as made out of FR4, Teflon or sequential buildup of materials using pressing, laminating or other techniques. Any now known or later developed circuit board material or other electrically insulative materials may be used. The support structure 12 is a singular or common support structure by being common to both electrical conductors and active electrical components 16. Different circuit boards may be bonded together or otherwise affixed to form a common support structure. Alternatively, the singular support structure 12 is formed as one piece with a continuous structure.

The singular support structure 12 includes two regions 20, 22. One region 22 is thicker along at least one dimension than other thinner region 20. The singular support structure 12 has a tiered shape. Additional tiers may be provided. In the embodiment shown in FIG. 1, the different thicknesses are provided in one dimension. The support structure 12 has the same shape and size along other dimensions. In alternative embodiments, a further tiering or difference in size or shape may be provided along other dimensions. For example, the thinner region 20 is taller or extends to a greater extent along the vertical dimension as shown in FIG. 1 than the thicker region 22. The length or size along the dimension extending generally orthogonally from the surface 24 is as shown or different. For example, the thicker section 22 has a lesser length, allowing for a lesser size of the overall support structure 12 or additional surface area within the thinner section 20.

The thicker region 22 includes the electrical conductors 14, such as traces deposited within multiple layers on the circuit board structure 12 with vias or other interconnect structures for routing the conductors between layers. The thinner section 20 includes the electrical conductors 14 on a fewer number of layers or thinner volume within the support structure 12 and an interconnection with one or more of the active electrical devices 16. Accounting for any type of connection or formation of the electrical devices on or within the support structure 12, the thinner section 20 is thin enough such that the height of the active electrical devices 16 does not extend beyond the width or thickness extent of the thicker section 22. In alternative embodiments, the active electronic 16 extends beyond the thickness extent of the thicker section 22.

The thicker region 22 of the singular support structure 12 includes a surface 24. The electrical conductors 14 are exposed on the surface 24. Exposed includes: the conductors 14 being within divits, holes or depressions; the conductors 14 being flushed with the surface 24; the conductors 14 extending beyond the surface 24 or combinations thereof. The surface 24 is an exposed edge of the circuit board material of the support structure 12. In one embodiment, the surface 24 is ground or cut to expose the electrical conductors and then plated or otherwise processed to form bumps at each of the exposed conductors 14.

The exposure pattern of the electrical conductors 14 is multidimensional. For example, the conductors 14 are distributed over two dimensions on the surface 24 as shown at 26. The multidimensional exposure pattern or array of the electrical conductors 14 corresponds to a multidimensional region of an array of z-axis electrical connections of a multidimensional transducer array. The thick section 22 includes electrical conductors 14 stacked and routed to match the pitch or distribution to the elements of the multidimensional transducer array. For example, the multidimensional distribution of electrical conductors 14 on the surface 24 has a same or substantially same pitch along two dimensions as the elements of the multidimensional transducer array. In one embodiment, the pitch of the elements is every 400 or 500 micrometers along two dimensions. The exposed conductors 14 have a same or similar pitch. Greater or lesser pitches with the same or different pitch size along each dimension may be used. A single or multiple conductors 14 are provided for each of the elements and/or each of the z-axis electrical connections within the transducer array. A single electrical conductor 14 per element of the array is provided, but two conductors 14 per element of the array may be provided. Singular contact is provided where a separate grounding plane is used with the transducer array. A biplex or two contacts per element may be used where transmit electronics are connected to one electrode of an element and receive electronics are connected to another electrode of a same element.

The exposed electrical conductors 14 allow for z-axis interconnection directly to the surface of the multidimensional transducer array, but may be indirectly connected in other embodiments. Once assembled adjacent to a multidimensional transducer array, the surface 24 and exposed electrical conductors 14 are in contact with z-axis electrical connections of the transducer array. Bump connections, wire bonding or other connection techniques for connecting the exposed electrical conductors 14 to the z-axis electrical connections of the transducer array may be used. In alternative embodiments, electrical interconnections other than z-axis electrical interconnections are provided on the transducer array. The distribution of exposed electrical conductors 14 is used to correspond to the distribution pattern used for the transducer array whether z-axis or other electrical interconnects.

The electrical conductors 14 are metallic conductors, such as copper or gold conductors. Paste or other conductive materials may be used. The conductors 14 are formed by deposition, etching, printing or other now known or later developed technique for placing conductors 14 on a circuit board or other structure with or without vias or other multilayer structures. Vias or other electrical conductors 14 may extend through the ground planes 18. The electrical conductors 14 within the assembly 10 are routed in any of various patterns, such as by providing the electrically isolated conductors 14 for conducting signals from different z-axis interconnections or elements of a transducer array to different inputs of same or different active electronic devices. Different electrical conductors 14 contact different ones of the z-axis electrical connection at the surface 24. The conductors 14 then route through the thick section 22 to the thinner section 20 for connection with an active electronic 16 or a connector. The electrical connectors 14 may alternatively or additionally connect with passive electrical devices, such as resistors, capacitors or inductors. The routing of the electrical conductors 14 within the thicker region 22 is used to redistribute the signal traces onto a fewer number of layers or lesser volume of the thinner section 20. The redistributed electrical conductors 14 are then patterned or otherwise formed to connect with different ones of the active electrical components.

The active electrical components 16 are semiconductors, such as transistors devices. "Active" electrical component is used to convey a type of device rather than operation of the device. Transistor based or switch based devices are active while resistors, capacitors or inductors are passive devices. The active electrical devices 16 are application specific integrated circuits, analog circuits, digital circuits, switches, multiplexers, controllers, processors, digital signal processors, field programmable gate array, or other now known or later developed active electrical component. In one embodiment, a single active electrical component, such as a single chip, is provided. As shown, different or a plurality of active electrical components 16 are provided. For example, a plurality of transmit circuits are provided as semiconductors chips, a plurality of receive circuits are provided as semiconductor chips, and a controller is provided as a semiconductor chip. The transmit components are separate from the receive components. Transmit components include high voltage pulsers, filters, memories, delays, phase rotators, multipliers, combinations thereof or other now known or later developed transmit beamformer component. The receive components include filters, amplifiers, delays, summers, combinations thereof or other now known or later developed receive beamformer component. Since receive beamformer components may operate at lower voltages than the transmit components, the receive and transmit components are separate devices, but a combination device for the transmit and receive operation may be provided. In one embodiment, the transmit and receive active electrical devices are formed as a same semiconductor device, such as disclosed in U.S. Pat. No. 6,380,766, the disclosure of which is incorporated herein.

The active electrical components 16 are formed within or connected to thinner section 20 of the singular support structure 12. For example, a flip-chip mounting or silicon die with a bump bond is used to connect the active electrical component 16 to the support structure 12 and the electrical conductors 14. Flip-chip mounting may minimize the height of the electrical components 16, avoiding an extension beyond the thickness of the thicker section 22. Wire bonding or surface mount technology may be used in other embodiments. Depressions may be used in the thinner section 20 for inserting the active electrical components within the support structure 12.

The electrical conductors 14 of the assembly 10 connect with the active electrical components 16. The electrical conductors 14 route signals from the multidimensional transducer array or z-axis interconnections at the surface 24 to various ones of the active electrical components 16. Additional electrical conductors 14 may interconnect different active electronic components or the active electronic components to connectors, such as a system interconnection. In one embodiment, a single electrical conductor 14 connects with both a transmit and receive active electrical components 16, such as through a transmit and receive switch connected on or within the structure 12. The same conductor 14 is then used for both transmit and receive operations for a particular element or z-axis interconnection of the multidimensional transducer array. Alternatively, separate electrical conductors 14 are provided for transmit or receive operation with a same element. In yet another embodiment, each element is restricted to only transmit or receive operation.

The grounding plane 18 is a metallic structure formed within the singular support structure 12, such as a grounding plane on a printed circuit board. In one embodiment, one or more grounding planes include a connector or other trace for connection to a heat sink. In an alternative or additional embodiment, one or more metallic fins are positioned adjacent to the thinner region 20 of the singular support structure 12 by placement over the active electrical components 16. For example, metallic heat distribution fins are inserted above the components 16. The fins may be connected with a heat sink. The heat sink provides either passive or active cooling.

FIG. 2 shows one embodiment of a system 28 for interconnection with a multidimensional transducer array 30. The system includes a plurality of modular assemblies 10, the multidimensional transducer array 30, and a system interconnection 32. Additional, different or fewer components may be provided. The system 28 is positioned within a probe housing. For example, a plurality of coaxial cables 34 connect the system 28 to an imaging system. Permanent or detachable connections may be provided. The system 28 is sized to fit within a hand held probe. For example, the circumference or shorter two dimensions of the system 28 is sized to allow a user to position their hand around at least a majority of the probe housing. Alternatively, the probe housing is larger and has a handle for user control. The length or longest dimension of the assembly 28 shown in FIG. 2 is less than 12 inches or about six inches, but other lengths may be provided.

The multidimensional transducer array 30 is an array of piezoelectric or microelectromechanical (capacitive membrane) elements and a backing block. The elements are distributed along two dimensions. The array is flat, concave or convex. Full or sparse sampling is provided. The elements are distributed along any of various pitches, such as every 400 or 500 micrometers, in a fully sampled spacing along two dimensions. Each of the elements of the array includes at least two electrodes. The elements transducer between electrical and acoustical energies. The backing block is positioned on one side of the array for limiting acoustic reflection from energy transmitted in an undesired direction. Matching layers, a lens, a window, or other now know or later developed multidimensional transducer array components may be included.

In another embodiment, the array 30 is one-dimensional. The modular assemblies 10 connect for operation with different elements along the lateral or azimuth dimension of the array 30.

For connection with the transmit and receive beamformer or other circuitry, a plurality of z-axis electrical connections are provided with the multidimensional transducer array. The z-axis electrical connections are distributed as an array. For example, a plurality of electrical interconnections connects one or more electrodes of each element through the backing block. The z-axis electrical connections are distributed in a same pitch and distribution as the elements of the array. The z-axis is more orthogonal than parallel with the surface of the distribution of the elements of the array (i.e., the z-axis corresponds to the depth or range dimension). The z-axis electrical connections form an array of exposed traces on a backing block surface of the transducer array 30. Alternatively, the z-axis electrical connections are formed on the transducer material without the backing block. The array of z-axis connections may have a different pitch than the array of elements, such as associated with angling the z-axis connections through the backing block to have greater separation or greater pitch. As another example, the electrical connections for one or more groups of elements are routed together, such as due to modular assembly of a multidimensional array. A fewer number of rows, columns or both rows and columns are provided for the z-axis electrical connections thinner for elements. For example, a greater density of row or column traces is provided with a fewer number of column or row traces, respectively. In one embodiment, the z-axis electrical connections include any one or more of the z-axis electrical connections disclosed in (application Ser. No. 10/815,307, the disclosure of which is incorporated herein by reference. Direct connection is provided with the exposed electrical conductors 14 of one of the modular assembly 10. In alternative embodiments, indirect connection is provided through one or more electrical trace routers, flex circuits or other devices.

As shown in FIG. 2, modular assemblies 10 are positioned adjacent to the multidimensional transducer array 30. While three assemblies 10 are shown with a two-dimensional region of z-axis interconnections 36 exposed without an adjacent modular assembly, additional modular assemblies are positioned over the exposed z-axis connections 36 so that each of the z-axis connections connects with a module 10. In alternative embodiments, less than all of the z-axis connections are connected with or positioned adjacent to a module 10. The surface 24 with the exposed electrical conductors 14 is positioned adjacent to the multidimensional transducer array 30, such as adjacent to the exposed z-axis connections of a backing block. Each of the exposed surfaces 24 connects with a subset of the elements and associated z-axis electrical connections. As shown, each subset includes entire columns but only portions of rows of elements. In alternative embodiments, a module 10 corresponds to a region with a lesser azimuth and elevation extent, a greater elevation extent, or a lesser azimuth extent. Other regions of the multidimensional transducer array and associated z-axis connections 36 are adjacent to other modules 10.

Figure 5:
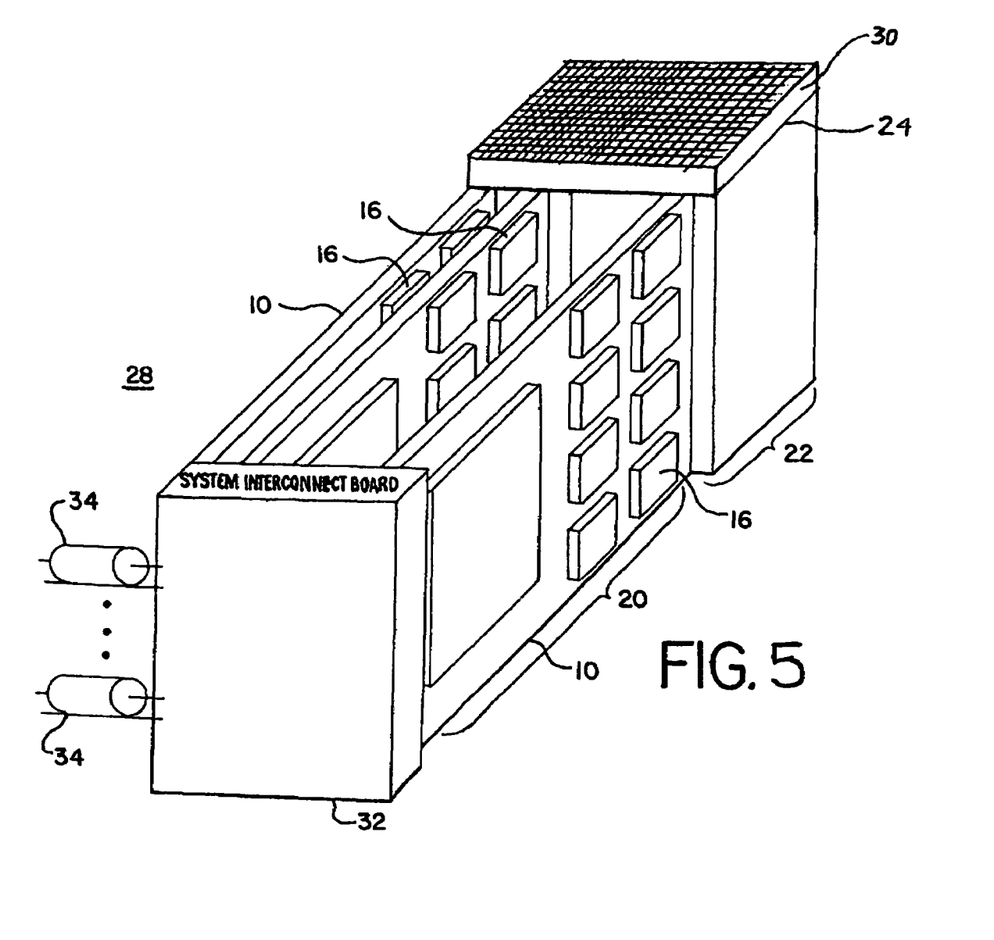
FIG. 5 is another perspective diagram of another embodiment of a plurality of modules of FIG. 1 connected with multidimensional transducer array.

FIG. 5 shows another embodiment where the surface 24 of the modules 10 with the exposed electrical conductors 14 is on a side of the thicker portion 22 rather than the end as shown in FIGS. 1 and 2. The z-axis connections 36 are positioned adjacent the electrical conductors 14 on the side surface 24 of each module 10. This arrangement may minimize z-axis space for the modules 10 where lateral space is available, such as in a transesophageal probe.

A multidimensional pattern of exposed electrical conductors 14 on the surface 24 corresponds to a pattern of the z-axis electrical connections. By positioning modules adjacent to one another, electrical conductors 14 are connected with of the z-axis connections 36. For example, the exposed electrical conductors 14 are electrically connected with the z axis connections 36 by bump bonding, asperity contact, wire bonding or other now known or later developed technique. The pitch of the exposed electrical conductors 14 and positioning is substantially the same as the pitch and positioning of the z-axis electrical connections 36. The thicker portions 22 of each of the modules 10 is sized to cover the z-axis connections 36 desired without covering other z-axis connections 36. Since the thickness matches the contact pitch of the acoustic array, a plurality of modules 10 may be positioned adjacent to each other. Tolerance errors in the thickness may be accommodated by grinding or shimming between the modules 10. For example, printed circuit board material, film or an epoxy is positioned between the modules 10. In yet another embodiment, the electronic modules are pre-aligned and bonded together to obtain a desired mechanical alignment. The entire structure is then positioned adjacent to the transducer array 30. The thicker regions 22 are generally in contact with each other between different modules 10. The thinner regions 20 are free of contact with each other. Alternatively, posts, metal fins, or other structure of the thinner region of one module contacts the thinner region of another module.

Bonding, laminating, mechanical connection (e.g., bolt, screw or latch) or pressure may be used to position and maintain the module 10 adjacent to the acoustic array 30. Tongue and groove, extensions and holes or other structures may be used to assist in alignment or positioning of the modules 10 adjacent to the multidimensional acoustic array 30. By using a plurality of modules 10, each module may be separately tested. Upon the failure of a part, less than the entire collection of electronics, assembly width the transducer array 30, or probe is discarded. In one embodiment, the modules 10 are bonded together before connection and bonding with the array 30. Alternatively, the modules 10 are bonded to the array 30 individually or at a same time as separate components. As an alternative to using modules, a single assembly 10 is provided that extends along the entire two-dimensional extent of the multidimensional transducer array 30.

The system interconnection device 32 is a circuit board, connector, cables or other now known or later developed device for electrically connecting each of the modules 10 to an imaging system. For example, flex connectors are provided on each of the modules 10, such as within the thin regions 20. The flex connectors are then used to connect to the coaxial cables 34 with a flexible circuit. As another example, an interconnection circuit board is positioned adjacent to the exposed edges at the end of the modules 10 at the thinner region 20. Bump bonding, wire bonding, edge connectors or other techniques are used to connect electrical conductors on the edge or other surfaces of the thinner region 20 to the interconnection board. In one embodiment, the active electronic 16 act to reduce the number of signals traces or electrical conductors needed to connect with the imaging system. For example, partial beamforming, beamforming, multiplexing, subarray mixing, combinations thereof or other now known or later developed technique for combining signals from a plurality of inputs to a fewer number of outputs is provided. By having a reduced number of signal lines, fewer number of connections between the system interconnection device 32 and each of the modules 10 is used. In an alternative embodiment, the active electronics 16 do not reduce the number of signal lines.

Figure 3:
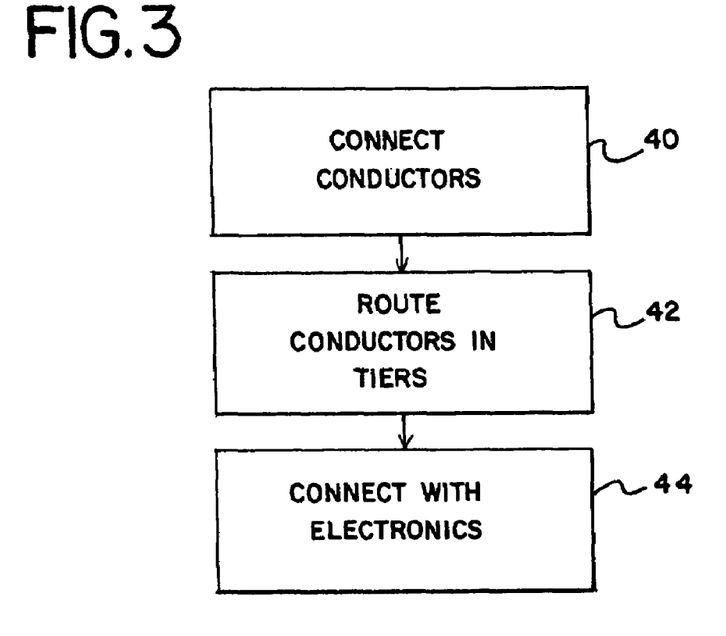
FIG. 3 is a flow chart diagram of one embodiment of a method for interconnecting active electronics with a multidimensional transducer array.

FIG. 3 shows one embodiment of a method for interconnecting active electronics with a multidimensional transducer array. Additional, different or fewer acts may be provided in the same or different order than shown in FIG. 3.

In act 40, the multidimensional array of conductors is connected with a subregion of the multidimensional transducer array. For example, the multidimensional transducer array is divided into two regions. Two different multidimensional arrays of conductors are connected with the two different regions. The regions may be of any shape or size or other distribution. The multidimensional array of conductors are placed adjacent to the interconnections of the multidimensional array, such as adjacent to z-axis connections on a backing block surface. Each region of z-axis connections or other conductors on the transducer array correspond to a subset of elements of the multidimensional transducer array. The pitch of the array of conductors is the same or substantially same as the pitch of the z-axis connections of the respective subregion of the array.

Through a asperity contact, wire bonding, solder, bonding or other electrical connection technique, an electrical connection between the transducer array and active electronics is provided. Mechanical connection may also be provided, such as by bonding, mechanical devices or combinations thereof.

In act 42, the conductors are routed within a substrate from distributed as a multidimensional array for contact with the z-axis connections to a thinner distribution within the same substrate. For example, the two tier structure disclosed in FIG. 1 is used for routing the conductors. The thicker distribution is associated with patterning the conductors for mating with the region of the transducer array. In one embodiment, the substrate has a thicker portion with vias and other patterning or etching of the conductors. The thicker portion is formed with a first number of layers, such as a first number of laminated or pressed layers of circuit board material. A thinner distribution is associated with a fewer number of layers of circuit board material. Using vias, patterning or etching, the conductors are routed from the multidimensional array distribution to a fewer number of layers for distribution within the thinner portion of the substrate.

The thicker and thinner substrate is formed by pressing or pressure with a form. Alternatively, a first number of layers are pressed together and then a second number of layers are pressed on just a portion of the structure forming the thicker portion. Alternatively, greater pressure is applied to one portion than another portion to form a thinner region out of the same number of layers as a thicker region. In yet another alternative, a thick substrate is formed and a portion removed, such as removed by grinding or machining. The conductors extend away from the multidimensional transducer array toward the thinner section. The conductors are more densely packed for the thinner distribution then adjacent to the multidimensional array.

In act 44, the conductors from the thinner distribution are connected with at least one active electronic device. By directly connecting a substrate to the z-axis interconnections and using the same substrate for connection with active electronic components, space usage is minimized. The thinner portion allows for the use of a plurality of different modules and/or active electronics within a lesser volume.

Figure 4:
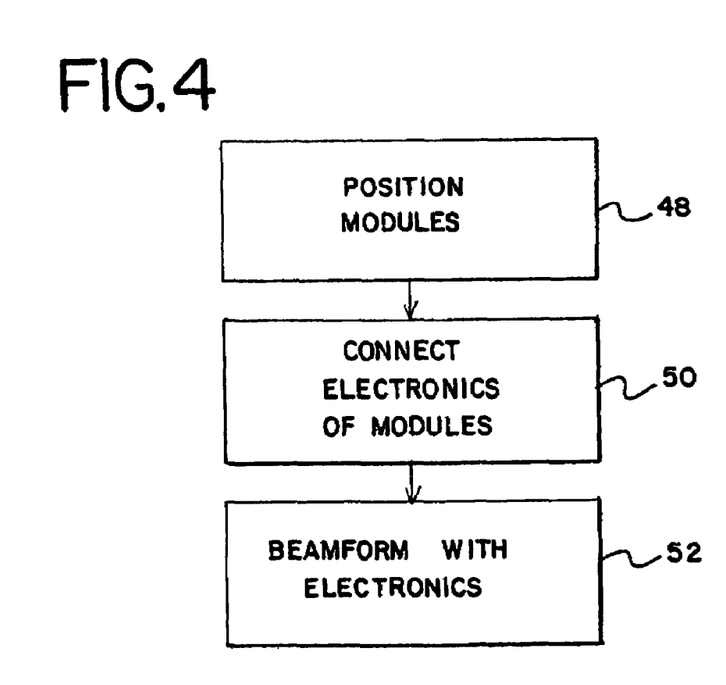
FIG. 4 is a flow chart diagram of an embodiment of a method for interconnection with a multidimensional transducer array.

FIG. 4 shows another embodiment of a method for interconnection with a multidimensional transducer array. Additional, different or fewer acts may be provided in the same or different order than shown in FIG. 4. The acts of FIG. 4 are implemented with the components 10 of FIG. 1 or the system 28 of FIG. 2, but other components or systems may be used in other embodiments.

In act 48, at least two modules are positioned adjacent to z-axis connectors of a multidimensional transducer array. Each of the modules are positioned adjacent to different regions of a surface of the multidimensional transducer array. In one embodiment, the modules are positioned directly adjacent to a backing block surface that is generally parallel with the distribution of elements of the multidimensional transducer array. Other surfaces of the same or different components of a multidimensional transducer array may be used. Indirect positioning may also be provided, such as positioning the modules adjacent to a spacer, film, or other structure in between the modules and the multidimensional transducer array. The modules have a thickness along one or more dimensions corresponding to each of the respective regions of contact. For example, the modules are stacked adjacent to each other and against the surface to cover each of the regions. Any number of modules may be used, such as three or more modules adjacent to each other and the surface of the array. The thickness of modules is the same as the corresponding region on the surface for at least one dimension. Each of the modules includes a plurality of exposed conductors that are positioned against the z-axis connectors or in each of the regions. The z-axis connectors are conductors or other electrical conductive structures. The exposed conductors of the modules have a substantially same pitch or distribution as the z-axis connectors, allowing for electrical conduction between each of the z-axis connectors and respective conductors or electrodes on the modules.

In act 50, the multidimensional transducer array is electrically connected with an active component of each of the modules. The z-axis interconnections of each region corresponding to different modules connects to active components of the corresponding module. By connecting exposed conductors of each of the modules to different ones of the z-axis connectors, different z-axis connectors and associated elements are connected with different active components. The conductors are routed within a thicker support structure to a thinner region of the same support structure in one embodiment. The conductors are then connected with the active components. The active components connect with the thinner region of the support structure. Asperity contact, bump bonding, wire bonding, surface mount technology or other connections may be used for connecting the conductors with the active components and/or connecting the conductors with the z-axis connectors of the multidimensional transducer array. The active electronics are modular, providing different electronics chips or devices for different modules. The same circuit or different circuit is provided for each of the chips or modules.

In act 52, the active components of each of the modules are used for beamforming. For example, transmit beamforming is provided. Waveforms are generated, delayed, anodized and/or filtered by the active components as part of the transmit beamforming operation. The conductors are then used to route signals to the elements of the transducer array for conversion to acoustic energy. As another example, the active component delays, amplifies, phase rotates, sums, filters or performs other receive beamforming operations associated with one or multiple of the elements of the transducer array. For example, partial beamforming corresponding to the entire region associated with a given module or corresponding to a plurality of subregions of the region associated with the given module is performed. The partially beamformed signals are routed to a system for imaging.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for interconnection with a transducer array, the system comprising:
    an array of z-axis electrical connections with the transducer array, the z-axis being more orthogonal than parallel with a surface of distribution of elements of the transducer array; and
    at least first and second modular circuit board assemblies each comprising:
        assembly electrical conductors;
        at least one active electrical component connected with at least one of the assembly electrical conductors, the at least one active electrical component operable to (a) relatively delay or phase, and sum, or (b) sub-array mix signals from multiple elements to output on a fewer number of output conductors; and
        a support structure common to the assembly electrical conductors and the at least one active electrical component;
    wherein the assembly electrical conductors of the first and second modular assemblies contact different ones of the z-axis electrical connections.

2. The system of claim 1 wherein the array of z-axis electrical connections comprises an array of exposed traces on a backing block surface, the assembly electrical conductors of the first and second modular assemblies connecting between the exposed traces and the at least one active electrical component of the first and second modular assemblies, respectively.

3. The system of claim 1 wherein the at least one active electrical component of the first modular assembly comprises a transmit component separate from a receive component and the receive component.

4. The system of claim 3 wherein one of the assembly electrical conductors connect with both the transmit and receive components.

5. The system of claim 3 wherein one of the assembly electrical conductors are free of connection with any transmit component.

6. The system of claim 1 wherein the support structure of the first module has a surface with the assembly electrical conductors exposed on the surface, and the assembly electrical conductors in contact with the z-axis electrical connections at the surface.

7. The system of claim 1 wherein the support structure of the first module comprises a thicker portion and a thinner portion, the thicker portion including the assembly electrical conductors and the at least one active component connected with the thinner portion.

8. The system of claim 7 wherein the thicker portion of the support structure has a surface with the assembly electrical conductors exposed in a multidimensional pattern, the multidimensional pattern corresponding to a multidimensional region of the array of z-axis electrical connections.

9. The system of claim 8 wherein the support structure of the second module comprises a thicker portion and a thinner portion, the thicker portion including the assembly electrical conductors and the at least one active component connected with the thinner portion, the thicker portion of the support structure has a surface with the assembly electrical conductors exposed in a multidimensional pattern, the multidimensional pattern corresponding to a different multidimensional region of the array of z-axis electrical connections than associated with the first module, the first and second modules positioned adjacent to one another, the thicker portions in contact and the thinner portions free of contact with each other.

10. A method for interconnection with a transducer array, the method comprising:
    (a) positioning at least two modules adjacent to z-axis connectors of the transducer array, each of the two modules adjacent different regions of a surface of the transducer array;
    (b) electrically connecting the transducer array with an active component of each of the at least two modules; and
    (c) (1) relatively delaying or phasing, and summing, or (2) sub-array mixing signals from multiple elements to output on a fewer number of output conductors with the active component of each of the at least two modules.

11. The method of claim 10 wherein each of the at least two modules has a thickness corresponding to the respective different regions, wherein (a) comprises stacking the at least two modules adjacent each other and against the surface.

12. The method of claim 10 wherein (a) comprises positioning at least three modules adjacent to each other, a thickness of at least one of the modules substantially the same as corresponding region on the surface.

13. The method of claim 10 wherein (a) comprises positioning exposed conductors of each of the at least two modules against the z-axis connectors, the exposed conductors having a substantially same pitch as the z-axis connectors.

14. The method of claim 10 wherein (b) comprises:
    (b1) connecting exposed conductors of each of the modules to different ones of the z-axis connectors;
    (b2) routing the conductors within a thicker support structure to a thinner region of the same support structure; and
    (b3) connecting the conductors with the active component, the active component connected with the thinner region of the support structure.

15. A component for interconnection with a multidimensional transducer array, the component comprising:
    at least two adjacent, separate singular circuit board support structures each comprising:
    first and second tiered regions, the first region being thicker along at least one dimension than the second region, the first region having electrical conductors and the second region having the electrical conductors and an interconnection with an active electrical device, wherein the exposed conductors have a multidimensional distribution on the surface at a substantially same pitch as elements of the multidimensional transducer array, the electrical conductors having a more dense distribution in the second region, a difference in thickness of the second region from the first region greater than a height of the active electrical device such that the support structures are stacked adjacently without contact of the active electrical device of one of the support structures contacting the other support structure; and a surface of the first region, the electrical conductors exposed on the surface.

16. The component of claim 15 wherein the singular support structure comprises a two tiered circuit board, the electrical conductors of the first region being on different layers and including vias.

17. The component of claim 15 wherein the exposed conductors have a multidimensional distribution on the surface at a substantially same pitch as a multidimensional array of electrical connections of the multidimensional transducer array.

18. The component of claim 15 wherein the active electrical device comprises separate transmit and receive devices.

19. The component of claim 15 further comprising at least one grounding plane formed in the singular support structure.

20. The component of claim 15 further comprising a system interconnection device connected with the second region.

21. The component of claim 15 further comprising at least one metallic fin adjacent to the second region.

22. The component of claim 15 connected with the multidimensional transducer array, the surface adjacent to a region of the multidimensional transducer array, the region corresponding to a multidimensional distribution of a subset of elements of the multidimensional transducer array, other regions of the multidimensional transducer array adjacent to other components comprises a substantially same singular support structure.

23. A method for interconnecting active electronics with a multidimensional transducer array, the method comprising:

(a) connecting multidimensional arrays of conductors of two or more modules with different sub-regions of the multidimensional transducer array;

(b) routing the conductors in each module within a circuit board substrate from distributed in the multidimensional array to a thinner distribution within the substrate; and (c) connecting the conductors in each module from the thinner distribution to at least one active electronic device;

wherein (b) comprises routing within a circuit board having at least two tiers, the thicker portion having more circuit board layers than the thinner portion.

24. The method of claim 23 wherein (b) comprises routing the conductors in a thicker portion of the substrate with vias from a first number of layers to a second, lesser number of layers of the conductors, the thinner distribution routing to a thinner portion of the substrate.

25. The method of claim 23 wherein (a) comprises placing the multidimensional array of conductors adjacent to z-axis interconnections in a multidimensional array corresponding to a subset of elements of the multidimensional transducer array.

26. The method of claim 23 wherein (b) comprises routing with the thinner distribution spaced away from the multidimensional transducer array, the conductors being more densely packed for the thinner distribution than the distribution in the multidimensional array.

27. The method of claim 23 wherein a pitch of the multidimensional array of conductors is substantially a same pitch as z-axis interconnections of the multidimensional transducer array.

28. The system of claim 1 wherein the assembly electrical conductors of the first and second modular assemblies contact the z-axis electrical connections at end surfaces of the first and second modular assemblies.

29. The system of claim 1 wherein the assembly electrical conductors of the first and second modular assemblies contact the z-axis electrical connections at side surfaces of the first and second modular assemblies.

30. The method of claim 10 wherein (a) comprises positioning end surfaces of the at least two modules adjacent to the z-axis connectors.

31. The method of claim 10 wherein (a) comprises positioning side surfaces of the at least two modules adjacent to the z-axis connectors.

* * * * *